(12) United States Patent
Høyland (10) Patent No.: US 11,909,293 B2
(45) Date of Patent: Feb. 20, 2024

(54) ELECTRIC MACHINE ROTOR SLEEVE

(71) Applicant: ROLLS-ROYCE ELECTRICAL NORWAY AS, Trøndelag (NO)

(72) Inventor: Jørg Høyland, Trondheim (NO)

(73) Assignee: ROLLS-ROYCE ELECTRICAL NORWAY AS, Trøndelag (NO)

( * ) Notice: Subject to any disclaimer, the term of this patent is extended or adjusted under 35 U.S.C. 154(b) by 89 days.

(21) Appl. No.: 17/670,880

(22) Filed: Feb. 14, 2022

(65) Prior Publication Data

US 2022/0278584 A1    Sep. 1, 2022

(30) Foreign Application Priority Data

Feb. 24, 2021 (GB) ...................... 2102582

(51) Int. Cl.
*H02K 1/278* (2022.01)
*H02K 5/02* (2006.01)
*H02K 1/2753* (2022.01)

(52) U.S. Cl.
CPC ............. *H02K 5/02* (2013.01); *H02K 1/2753* (2013.01)

(58) Field of Classification Search
CPC ........ H02K 1/28; H02K 5/128; H02K 1/2706; H02K 1/278; H02K 2213/03; H02K 21/14
USPC .......................................................... 310/43
See application file for complete search history.

(56) References Cited

U.S. PATENT DOCUMENTS

| | | | | |
|---|---|---|---|---|
| 5,122,704 A | * | 6/1992 | Blakeley | H02K 3/46 310/43 |
| 5,485,045 A | * | 1/1996 | Canders | H02K 15/03 310/156.31 |
| 2004/0021396 A1 | | 2/2004 | Ehrhart et al. | |
| 2012/0313461 A1 | * | 12/2012 | Takeuchi | H02K 7/003 310/43 |
| 2015/0188369 A1 | * | 7/2015 | Arimatsu | H02K 1/278 310/156.28 |
| 2015/0330231 A1 | * | 11/2015 | McGuire | F01D 5/28 428/36.9 |
| 2017/0373548 A1 | * | 12/2017 | Arimatsu | H02K 1/2781 |

(Continued)

FOREIGN PATENT DOCUMENTS

| | | |
|---|---|---|
| CN | 204906030 U | 12/2015 |
| EP | 1 369 976 A1 | 12/2003 |
| GB | 2 250 642 A | 6/1992 |

(Continued)

OTHER PUBLICATIONS

U.S. Appl. No. 17/670,903, filed Feb. 14, 2022 in the name of Jørg Høyland.

(Continued)

*Primary Examiner* — Tran N Nguyen
*Assistant Examiner* — Masoud Vaziri
(74) *Attorney, Agent, or Firm* — Oliff PLC (57) ABSTRACT

A rotor sleeve (46) for a rotor (29) of an electric machine (28). The sleeve comprises a plurality of layers (66a, 66b) of carbon fibre reinforced polymer, each layer (66a, 66b) comprising fibres (68) oriented substantially 90° to a rotational axis (X) and at least one layer (72a) of fibres (74) having a lower modulus of elasticity provided between layers (66a, 66b) of carbon fibre reinforced polymer. The lower modulus of elasticity fibres (74) are oriented between 50° and 75° relative to the rotational axis (X).

16 Claims, 12 Drawing Sheets

(56) References Cited

U.S. PATENT DOCUMENTS

2019/0199151 A1 6/2019 Loder et al.
2022/0190660 A1 6/2022 Flower et al.

FOREIGN PATENT DOCUMENTS

| JP | H09-19093 A | 1/1997 | |
|----|----|----|----|
| JP | 2017-163752 A | 9/2017 | |
| JP | 2018-082564 A | 5/2018 | |
| WO | 2013/160739 A2 | 10/2013 | |
| WO | WO-2020188006 A1 * | 9/2020 | ............... H02K 1/04 |

OTHER PUBLICATIONS

U.S. Appl. No. 17/670,857, filed Feb. 14, 2022 in the name of Jørg Høyland et al.
Jun. 21, 2021 Search Report issued in British Patent Application No. 2102581.2.
Jun. 21, 2021 Search Report issued in British Patent Application No. 2102582.0.
Jun. 23, 2021 Search Report issued in British Patent Application No. 2102583.8.
Jun. 23, 2023 Office Action received in U.S. Appl. No. 17/670,857.
Aug. 1, 2022 Search Report issued in European Patent Application No. 22157653.1.
Aug. 1, 2022 Search Report issued in European Patent Application No. 22157656.4.
Aug. 1, 2022 Search Report issued in European Patent Application No. 22157654.9.
Sep. 7, 2023 Office Action issued in U.S. Appl. No. 17/670,857.
Nov. 3, 2023 Notice of Allowance issued in U.S. Appl. No. 17/670,857.

* cited by examiner

ELECTRIC MACHINE ROTOR SLEEVE

BACKGROUND

The present disclosure concerns a rotor sleeve for an electric machine. The present disclosure also relates to a machine having the rotor sleeve, and a hybrid electric propulsion system and aircraft having the electric machine.

Permanent magnet machines are known, in which a rotor comprising one or more permanent magnet is provided to rotate relative to a stator comprising electric windings.

Typically, the rotor comprises a radially inner rotor core/shaft to which the magnets are bonded. Securely affixing the permanent magnets to the inner core is difficult in view of the incompatible materials typically used, and the high centrifugal forces which act to drive the magnets radially outwards. Such centrifugal forces may be particularly high in the case of high-power electric machines in view of the large rotor diameters and higher rotational speeds encountered by such machines in use.

This problem is particularly acute for electric machines used on aircraft. Such machines must have a high power density, and so must rotate at high speeds. Additionally, the release of one or more permanent magnets may represent a serious safety issue due to the high velocity debris, in addition to the safety issues inherent in failure of the machine itself.

Conventionally, such machines comprise a rotor sleeve (also known as a "rotor banding") which surrounds the rotor to contain the permanent magnets. This banding must be located in the air-gap between the rotor and stator. Consequently, where such a banding is installed, the distance between the rotor and stator is increased, leading to reduced machine power density.

It is known to form rotor sleeves of either high strength metals such as steel, or composite materials, such as carbon fibre reinforced plastic (CFRP). One method of forming such sleeve is to wind matrix impregnated carbon fibres onto a mandrel. Such a process is known as "filament winding". Conventionally, such fibres would be wound around the mandrel in an orientation perpendicular to an axial direction of the resultant sleeve. The mandrel may then either be removed by dissolution, or may remain to become part of the composite component.

However, it has been found that such sleeves are prone to "splitting" in the axial direction, resulting in separate rings instead of a single, tubular sleeve. Such failures may result in a containment failure of the permanent magnets, resulting in electric machine failure.

A prior art proposal for ameliorating this issue is to interpose perpendicularly wound carbon fibre layers with axially wound glass fibre layers. Such a proposal is suggested in a publication titled "Composite Energy Storage Flywheel Design for Fatigue Crack Resistance", Jerome T. Tzeng, published in the 2008 14th Symposium on Electromagnetic Launch Technology.

SUMMARY

However, the inventors have found that such interposed layers nonetheless experience failures, and so an improved electric machine sleeve is required.

According to a first aspect there is provided a rotor sleeve for a rotor of an electric machine, the rotor sleeve defining a rotational axis and comprising: a plurality of layers of carbon fibre reinforced polymer, each layer comprising fibres oriented substantially 90° to the rotational axis; at least one layer of fibres having a lower modulus of elasticity provided between layers of carbon fibre reinforced polymer, wherein the lower modulus of elasticity fibres are oriented between 50° and 75° relative to the rotational axis.

It has been found that, by providing a layer of low modulus of elasticity fibre between the layers of carbon fibre, which is provided at the specified angle, rotor sleeve failures are substantially reduced.

The carbon fibres of each carbon fibre reinforced polymer layer may be oriented between 89° and 90° to the rotational axis. It has been found that orienting the fibres within this range of angles results in an improvement in tensile strength of the fibres.

The carbon fibres of one or more carbon fibre reinforced polymer layer may be oriented between 89.2° and 89.9° to the rotational axis. In one embodiment, the carbon fibres of one or more carbon fibre reinforced polymer layer may be oriented approximately 89.5° to the rotational axis.

One or more layer of carbon fibre reinforced polymer may define a radial thickness of no more than 2 mm, and may define a radial thickness of between 1 and 2 mm. It has been found that thicknesses greater than 2 mm may result in a loss of transverse strength.

The sleeve may comprise between 5 and 20% low modulus of elasticity fibre reinforced composite. This amount of low modulus of elasticity fibre allows the great majority of the composite fibres to comprise carbon fibre, resulting in high strength, while providing sufficient axial strength to prevent failure.

The low modulus of elasticity fibres may be oriented approximately 60° relative to the rotational axis.

Each low modulus of elasticity fibre layers may comprise first fibres oriented 50° to 75° relative to the rotational axis in a clockwise direction interwoven with second fibres oriented 50° to 75° relative to the rotational axis in an anti-clockwise direction.

The first low modulus of elasticity fibres may be oriented approximately 60° relative to the rotational axis in a clockwise direction, while the second low modulus of elasticity fibres fibres may be oriented approximately 60° relative to the rotational axis in an anti-clockwise direction.

The low modulus of elasticity fibres may comprise any of glass fibre, aramid, ultra-high molecular weight polyethylene (such as Dyneema™) and poly(p-phenylene-2,6-benzobisoxazole) (PBO).

The carbon fibre and/or lower modulus fibres may be provided within a matrix material such as epoxy, cyanate ester or phenolic resin.

The lower modulus fibres may comprise any of glass fibre, aramid, PBO, E-glass, S-glass, nylon, or Dyneema, or a mixture of one of more of these materials.

According to a second aspect there is provided a method of manufacturing a sleeved rotor of an electric machine, the method comprising:

providing a first layer of carbon fibre filaments aligned substantially 90° relative to a rotational axis;

providing a second layer of fibre filaments having a lower modulus of elasticity than the carbon fibre filaments wound around the first layer of carbon fibre filaments; and providing a third layer of carbon fibre filaments around the second layer of fibre filaments aligned substantially 90° to the rotational axis; wherein the fibres of the second layer are oriented between 50° and 75° relative to the longitudinal axis.

The fibres of the second layer may comprise first fibres oriented 50° to 75° relative to the rotational axis in a clockwise direction interwoven with second fibres oriented 50° to 75° relative to the rotational axis in an anti-clockwise direction.

The rotor may comprise one or more permanent magnets, and the method may comprise sliding the sleeve over the outer diameter over the one or more permanent magnets.

The method may comprise, in a first step, winding the first, second and third layers of filaments around a mandrel, followed by curing of the filaments to form a composite ring.

The method may comprise, in a second step subsequent to the first step, urging the cured ring over a conical stressing device to increase an inner diameter of the ring and produce a pre-stress on the ring, and sliding the sleeve over the outer diameter of the rotor.

According to a third aspect there is provided an electric machine comprising a rotor fitted with a sleeve according to the first aspect.

The electric machine may be configured to operate as one or both of a generator and a motor.

The electric machine may comprise a permanent magnet electric machine comprising one or more surface permanent magnets provided at an outer diameter of the rotor.

According to a fourth aspect there is provided an aircraft propulsion system comprising an electric machine according to the third aspect.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF EMBODIMENTS

Figure 1:
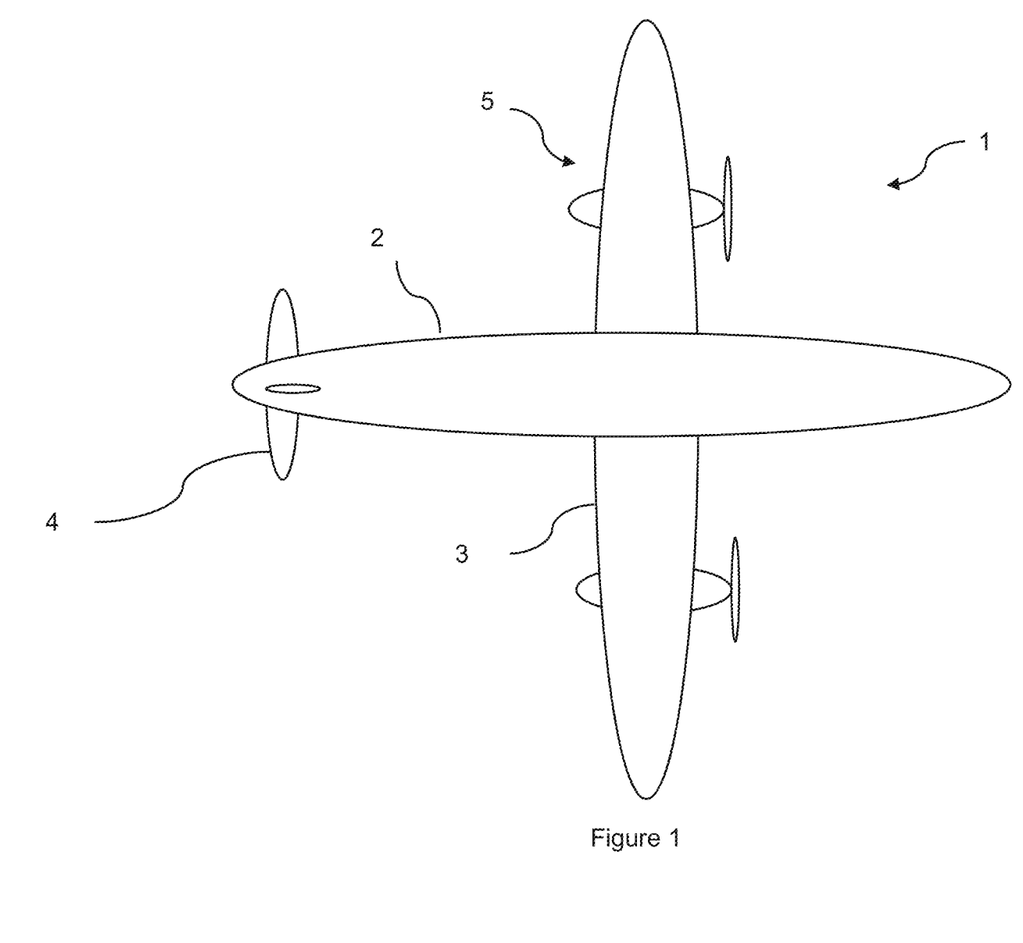
FIG. 1 is a plan view of a first aircraft comprising a parallel hybrid propulsion system.

With reference to FIG. 1, an aircraft 1 is shown. The aircraft is of conventional configuration, having a fuselage 2, wings 3, tail 4 and a pair of propulsion systems 5. One of the propulsion systems 5 is shown in figure detail in FIG. 2.

Figure 2:
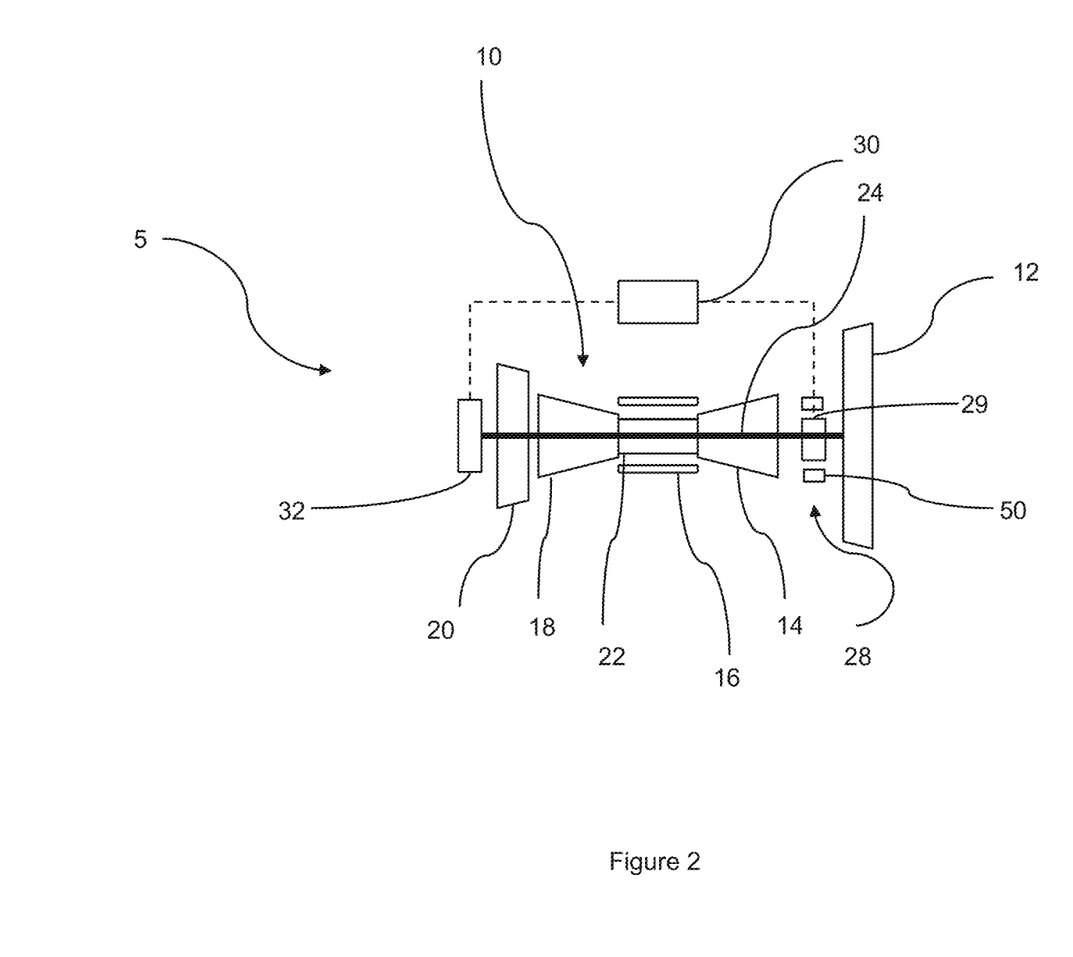
FIG. 2 is a schematic diagram of a parallel hybrid propulsion system for the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a propulsor in the form of a fan/propeller 12, a compressor 14, combustion equipment 16 and high and low-pressure turbines 18, 20.

The gas turbine engine 10 works in the conventional manner so that air is accelerated by the fan 12 to produce two air flows: a first core air flow into the compressor 14 and a second air flow which bypasses the compressor 14 to provide propulsive thrust. The core air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle to provide additional propulsive thrust. The high 18 and low-pressure turbines 18, 20 drive respectively the compressor 14 and fan 12, each by suitable interconnecting shaft 22, 24.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 5 further comprises one or more electrical machines. In particular, the system 5 comprises an electric motor 28. The motor 28 is of a conventional type, such as a permanent magnet electric machine, and is configured to drive a propulsor such as the fan 12. In the present embodiment, the motor 28 is coupled to the fan 12 via the low-pressure shaft 24. In this embodiment, the electric motor 28 is of a "core shaft mounted" type, in which a rotor 29 of the motor 28 is mounted directly to a surface of the low-pressure shaft 24, and is surrounded by a stator 50, provided radially outwardly of the rotor 29. The stator comprises electrical windings (not shown), which can be energised to produce a rotating magnetic field. This rotating magnetic field interacts with a magnetic field of the rotor 29, to cause rotation when acting as a motor. Consequently, the fan 12 may be powered by either or both of the gas turbine engine 10 via the low-pressure turbine 20, and the motor 28.

The electric motor 28 is coupled to an energy storage device 30 in the form of one or more of a chemical battery, fuel cell, and capacitor, which provides the electric motor 28 with electrical power during operation. In some cases, multiple energy storage systems, which may be of different types (chemical battery, fuel cell etc) may be provided for each propulsion system 5. In other cases, a common energy storage device 30 may be provided for multiple propulsion systems.

The propulsion system optionally comprises one or more further electric machines such as a generator 32, which is coupled to one or both of the motor 28 and the energy storage device 30, such that additional electrical energy can be provided in operation. The generator 32 is typically driven by the low-pressure shaft 24 of the gas turbine engine 10. The generator 32 may be coupled to the shaft 24 via a gearbox and/or clutch to allow for selectively connecting and disconnecting the generator 32 from the shaft 24. In some cases, the motor 28 may act as a generator.

Figure 3:
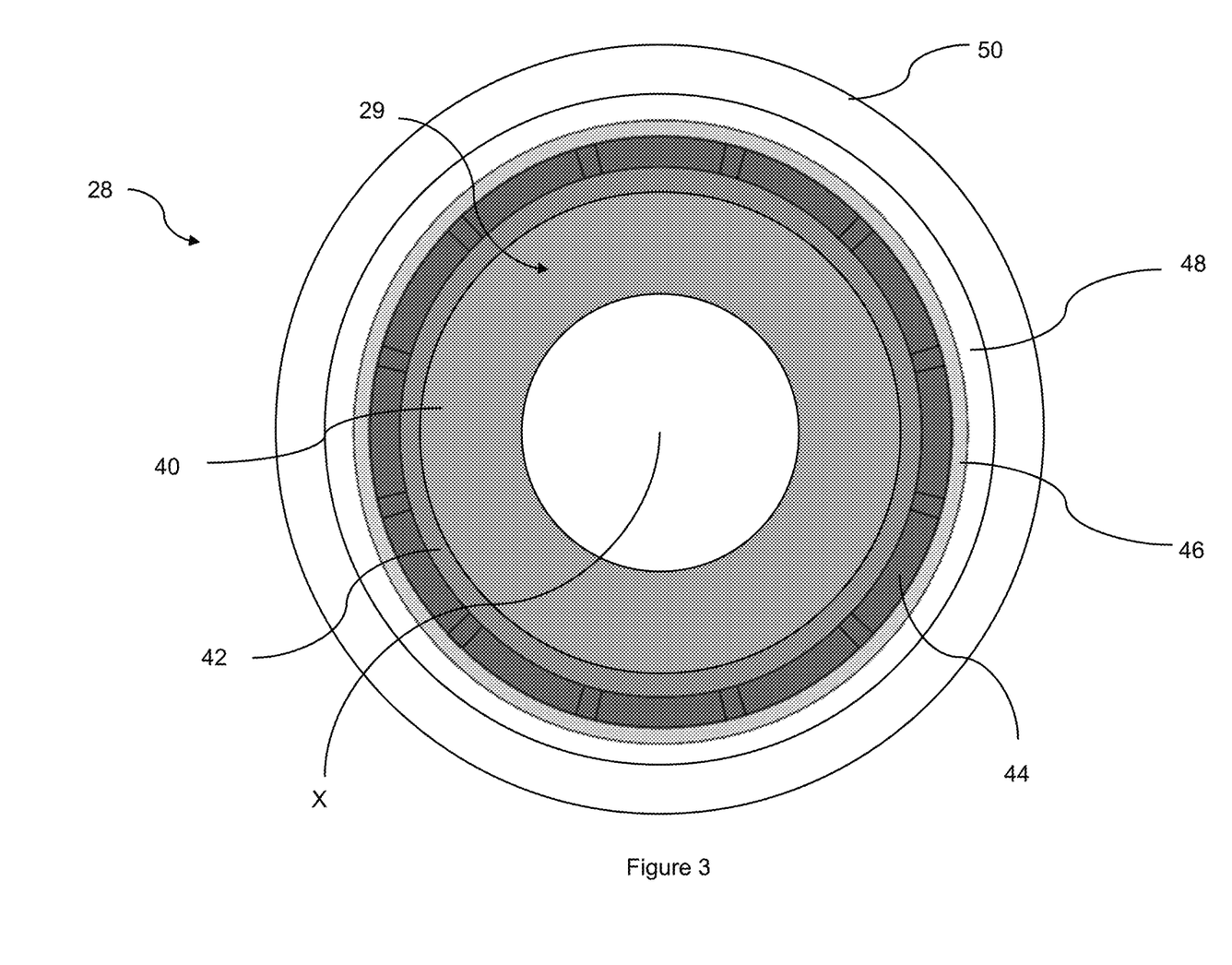
FIG. 3 is a schematic cross-sectional view of an electric machine suitable for the propulsion system of FIG. 2.

Details of the electric motor 28 are shown in FIG. 3. As will be appreciated, the generator 32 is broadly similar to the motor 28.

The motor 28 comprises a rotor 29 and a stator 50.

The rotor 29 comprises a shaft 40 which defines a rotational axis X. The shaft 40 is typically constructed from a structural material such as steel, aluminium or titanium, and is configured to be rotated by the motor 28 in use, and is coupled to the propulsor 12.

Radially outward of the shaft is a plurality of steel laminations 42. The steel laminations are typically thin, to minimise eddy currents, to thereby reduce losses and heat generation. Alternatively, the rotor may not comprise laminated steel, and the magnets could instead be attached directly to the shaft 40. In those cases, a steel alloy such as 9310 could be used for the shaft 40.

Radially outward of the laminations 42 is a plurality of permanent magnets 44. The permanent magnets 44 are provided on a circumferential outer surface of the laminations 42, and so the rotor can be said to be of the "surface permanent magnet" type. The permanent magnets 44 are typically adhered to the steel laminations by an adhesive.

In order to maintain the rotor in position in use, in opposition to centrifugal loads on the rotor, the rotor further comprises a rotor sleeve 46 which is provided radially outward of and at least partly surrounding the permanent magnets 44. The rotor sleeve 46 is described in further detail below, and is shown in more detail in FIG. 4.

Radially outward of the sleeve 46 is an air gap 48, which allows for relative rotation between the rotor and stator 50. The stator 50 is provided radially outward of the air-gap 48 and comprises a plurality of stator coils (not shown), which, when energised, drive the rotor by interaction between the magnetic fields of the stator coils and the permanent magnets 44.

Figure 6A:
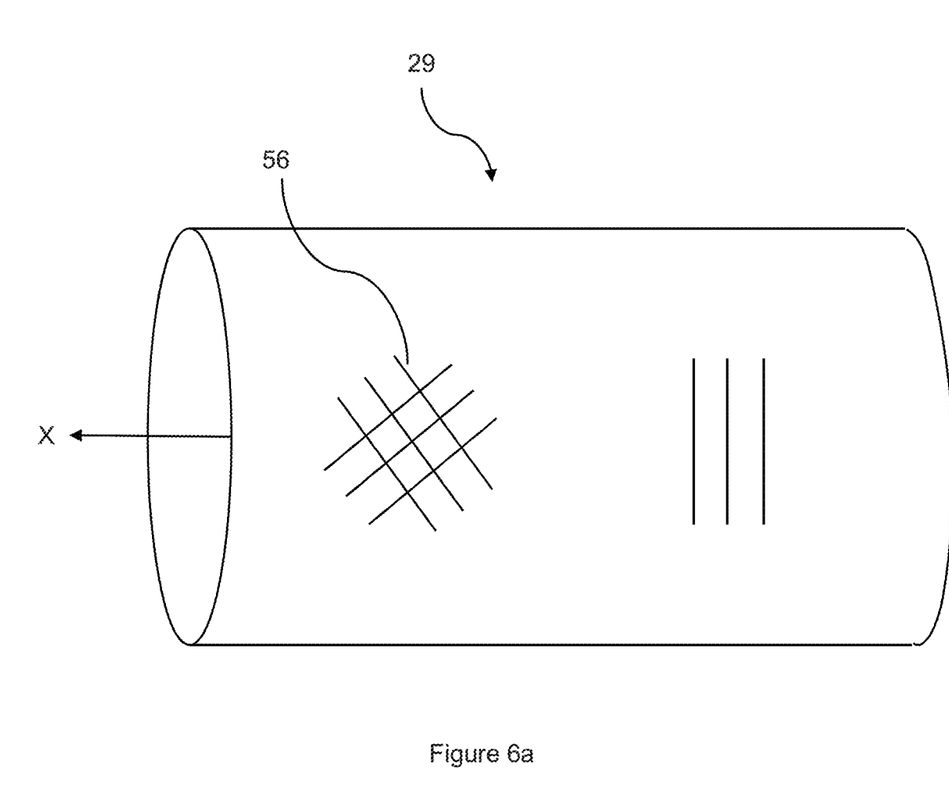
FIGS. 6a and 6b are diagrams showing definitions of orientations for the sleeve of FIG. 4.
Figure 6B:
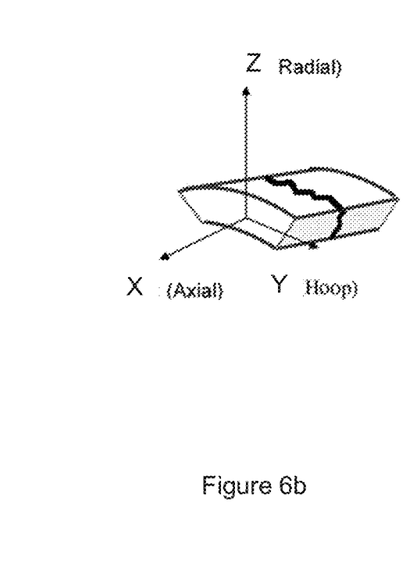

Referring to FIGS. 6a and 6b, various directions are defined. The sleeve 46 is of generally cylindrical shape, and defines a longitudinal, rotational axis X along its length. This axis X corresponds to the rotational axis of the sleeve when installed on the motor 28. Directions parallel to the rotational axis are described as the axial direction.

A hoop direction Y is defined normal to the X direction, extending circumferentially around the cylinder. Similarly, a radial direction Z is defined normal to both the axial and hoop directions X, Y, which extends radially outward from the rotational axis.

Figure 4:
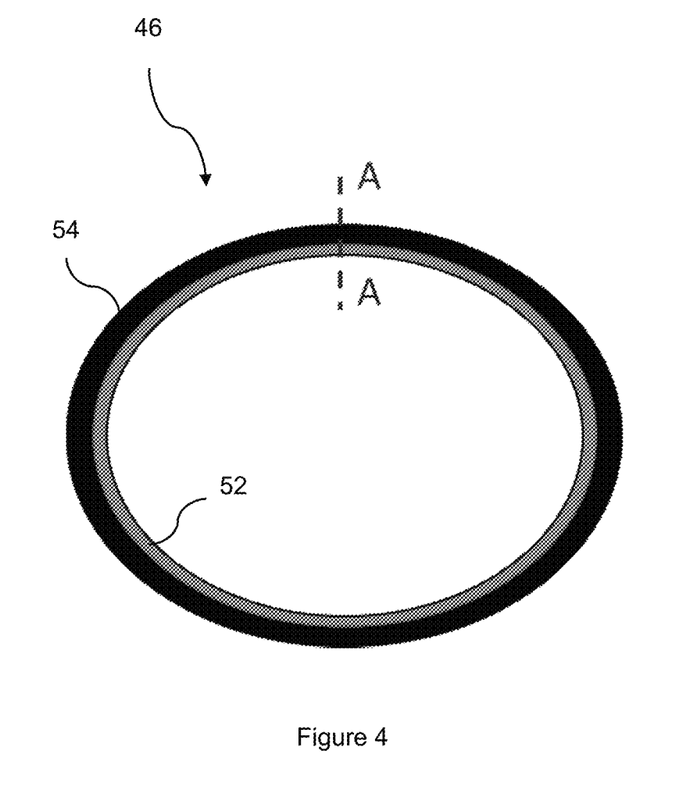
FIG. 4 is a cross-sectional view of a of the electric machine of FIG. 3.

Referring now to FIG. 4, the rotor sleeve 46 is shown in more detail. The sleeve optionally comprises an inner layer 52 and outer layer 54 which comprise different materials.

The inner layer 52 comprises a composite material comprising filaments 56 of a first material having a relatively low modulus of elasticity. That is to say, the first material is relatively elastic, and can deform to a relatively large degree when a tensile force is applied. The material of the first filaments must also be relatively flexible, to allow it to be wound into shape. Examples of suitable materials include glass fibres such as E-glass or S-glass, aramid, Polybenzoxazole (PBO), nylon, or Dynema, or a mixture of one of more of these materials. In one example, in the case of glass fibres, the fibres have a stiffness modulus of approximately 50-90 Giga-Pascals GPa.

The fibres 56 of the inner layer 52 are embedded within a matrix material such as a resin such as phenolic, epoxy, cyanate ester resin or PEEK 58. Together, the fibres 56 and resin 58 form a composite material.

The outer layer 54 itself comprises a sandwich construction comprising a plurality of individual further layers of different materials and construction.

Figure 7:
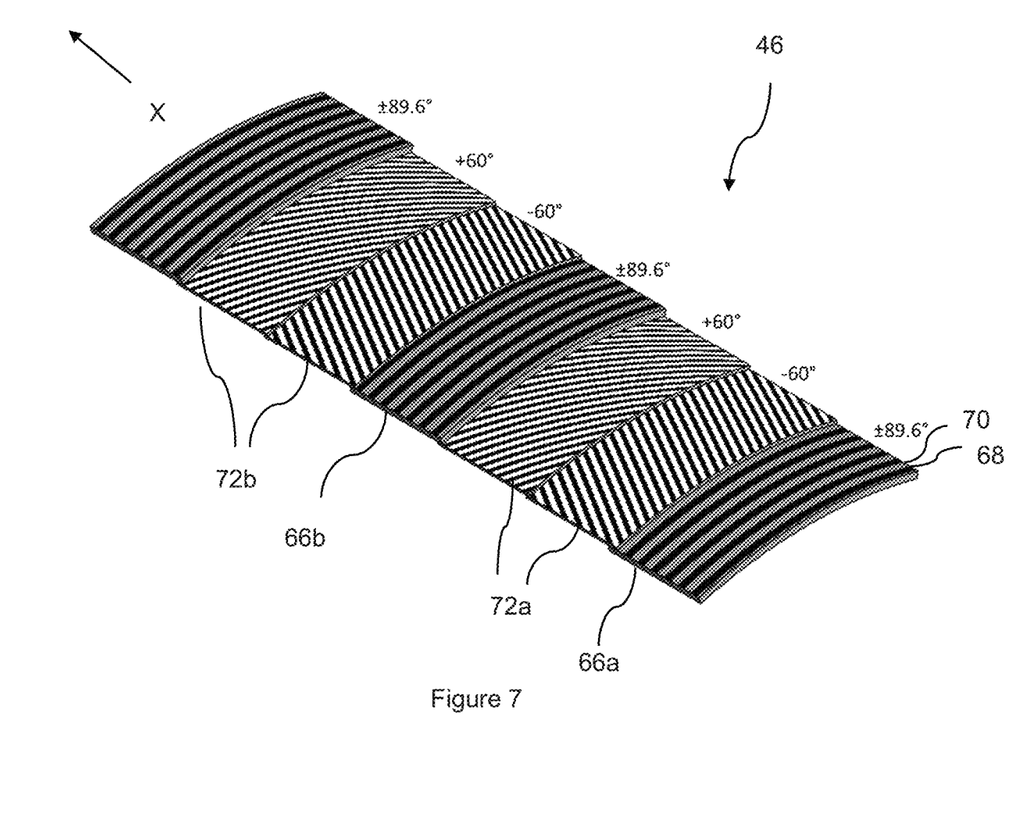
FIG. 7 is a cross-sectional perspective view of the rotor sleeve of FIG. 4, showing various layers.

The outer layer 56 is shown in more detail in FIG. 7. The outer layer comprises a first layer 66a. The first layer 66a comprises a composite material comprising carbon fibre filaments 68 embedded within a polymer matrix 70 such as such as a resin such as phenolic, epoxy, cyanate ester resin or PEEK.

Each of the fibres 68 within the first layer is oriented substantially in the hoop direction Y, i.e. approximately 90° to the axial direction. It has been found however that additional advantages are provided where the fibre 68 is wound at an angle somewhat less than 90°, and in this embodiment, the fibre 68 is wound at 89.6°. it has been found that additional benefits can be obtained where the carbon fibre 68 is wound at angles between 89° and 90°, and preferably between 89.2 and 89.9°, for reasons that will be explained in further detail below. The first layer 66a typically has a thickness less than 2 mm, and preferably between 1 and 2 mm, for reasons that will be explained below.

Immediately adjacent the first layer 66a is a second layer 72a. The second layer 72a comprises a composite material comprising filaments 74 embedded within a matrix material. The filaments 74 however differ from the filaments 70 in both their materials, and their orientation. The filaments 70 are composed of fibres having a lower modulus of elasticity than the fibres 70, such as any of glass fibre (such as E-glass or S-glass), aramid, Polybenzoxazole (PBO, nylon, or Dynema. Glass fibres have been found to be particularly suitable, in view of their tolerance of higher temperatures. The fibres are also oriented at between 50° and 75° relative to the rotational direction, and approximately 90° relative to the radial direction. In the present example, the fibres are oriented ±60° relative to the axial direction. The fibres are typically provided as woven sheets, comprising first fibres woven at 50° to 75° in a clockwise direction from the axis X, interwoven with second fibres woven at 50° to 75° in an anti-clockwise direction from the axis X. The second layer 72a typically has a thickness of between 0.1 and 0.2 mm.

The second layer 72a is then followed by a subsequent first layer 66b, which is followed by a further second layer 72b, and the pattern continues. As many layers as are necessary are then built up, to provide the necessary thickness to achieve the desired strength.

In total, the fibres of the outer layer 54 comprise between 80 and 95% carbon fibre filaments by volume (vol %), with the lower elastic modulus fibres providing the remaining 5 vol % to 20 vol %. Consequently, the strength providing by the carbon fibres is maintained, since these make up the majority of the fibres in the composite. In one example tested by the inventors, the sleeve fibre content consisted of 15 vol % glass fibres, and 85 vol % carbon fibres.

In one example, the low elastic modulus filaments comprise an elastic modulus of approximately 93 Giga-Pascals (GPa), while the matrix material in which the fibres are situated have an elastic modulus of approximately 8 GPa. For a volume fraction of 50%, this gives an overall elastic modulus of the low elastic modulus filament layer of approximately 50 GPa. The carbon fibre filaments comprise an elastic modulus of approximately 324 GPa. In view of the carbon fibre filaments being wound in a hoop direction, greater volume fractions of approximately 65% can be achieved. If the same matrix material is used, having an elastic modulus of 8 GPa, this gives an overall elastic modulus for the carbon fibre composite layer of approximately 213 GPa. Consequently, the carbon fibre filaments have a modulus of elasticity approximately 3 to 4 times higher than the lower elastic modulus filaments. The ratio of carbon fibre stiffness to lower modulus fibre stiffness may be in the range of 2:1 to 10:1.

Figure 8:
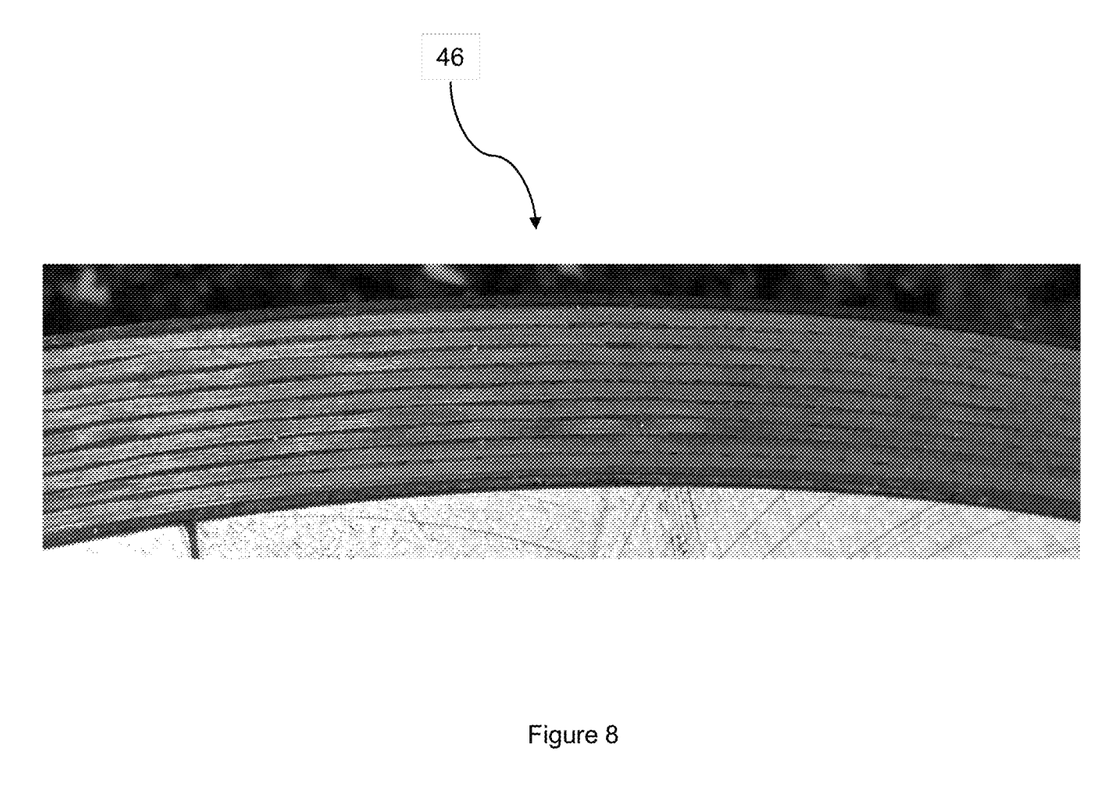
FIG. 8 is a photographic image of a cross section through a sleeve in accordance with the present disclosure.

FIG. 8 shows a cut-through of an example sleeve 46 prepared by the inventors, with the various layers highlighted. In tests, the sleeve 46 had improved performance relative to conventional sleeves.

Figure 5A:
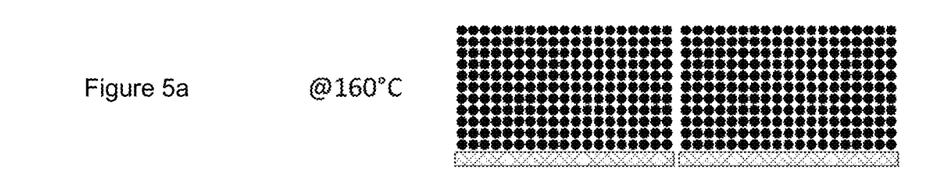
FIGS. 5a to 5c are cross sectional views of a sleeve not in accordance with the invention, showing damage that can occur in use.
Figure 5B:
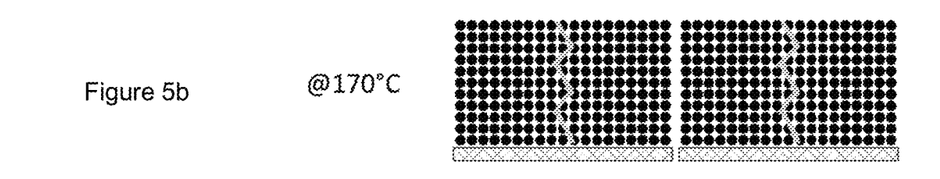
Figure 5C:
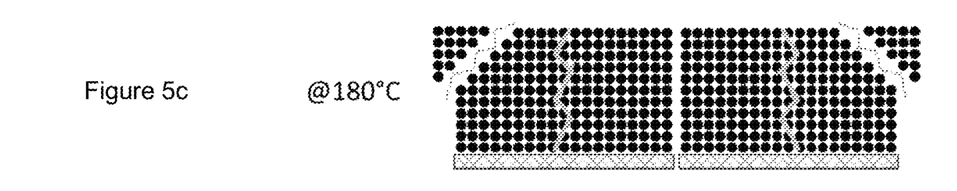

Referring now to FIGS. 5a to 5c, a conventional sleeve 146 was prepared for comparison to the sleeve 46. The sleeve 146 comprises carbon fibre embedded in resin, wherein the fibres are oriented in the hoop direction, i.e. 90° relative to the axial direction. The sleeve was heated and rotated, to simulate realistic conditions in service.

The sleeve 146 faired reasonably well at temperatures up to 160° C. However, as the temperature increased to 170°, cracks C began to form in the hoop direction. The cracks continued to propagate, and at 180°, the sleeve began to fail, with parts of the sleeve detaching. Such a failure would be unacceptable in use, particularly since temperatures in high speed motors in aerospace applications will typically exceed 180° C., and speeds between 12000 and 30000 RPM. It was found that the strength of the conventional sleeve decreased as radial thickness increased, with strength reducing by 15% with every doubling in thickness.

As noted above, one solution to this problem of cracks in the hoop direction can be alleviated somewhat by providing glass fibres placed in the axial direction between each carbon fibre layer. However, the inventors have found that this results in reduced strength in the hoop direction, and so can result in cracks extending in the axial direction within the glass fibre layers. These failures can propagate between layers, which can result in overall failure of the sleeve.

The sleeve 46 has also been tested by the applicants, which comprises second layers having glass fibres angled at +60° and −60° respectively. The carbon fibre composite layers were each approximately 1 mm thick, and the carbon fibres were oriented at 89.6°. The sleeve had an overall thickness of approximately 8.4 mm.

In testing, the strength in the hoop direction was found to be increased relative to the sleeves having axially oriented fibre glass layers, while the resistance to cracks in the hoop direction was improved relative to the conventional carbon fibre sleeve. In representative testing, at high temperatures and rotational speeds (180° C. and 16000RPM), no cracking of any of the layers was encountered. This is thought to be in part due to the orientation of the glass fibres, which provides axial reinforcement, preventing cracks.

At angles closer to the hoop direction (i.e. greater than 75°) it is thought that the difference in elastic modulus of the glass and carbon fibres may result in high shear stresses, which could be initiation points for failure. The low modulus of elasticity of the glass fibres allows for compliance with the carbon fibre of the adjacent layers, which are at different diameters.

On the other hand, at lower angles, (closer to the axial direction), transverse failures are encountered, as shown above. Consequently, the range of fibre orientations disclosed herein provide protection from both failure mechanisms identified by the inventors. The different orientation of the low modulus layers relative to each other and the carbon fibre layers also prevents propagation of any cracks between layers, thereby further improving failure resistance.

Figure 9:
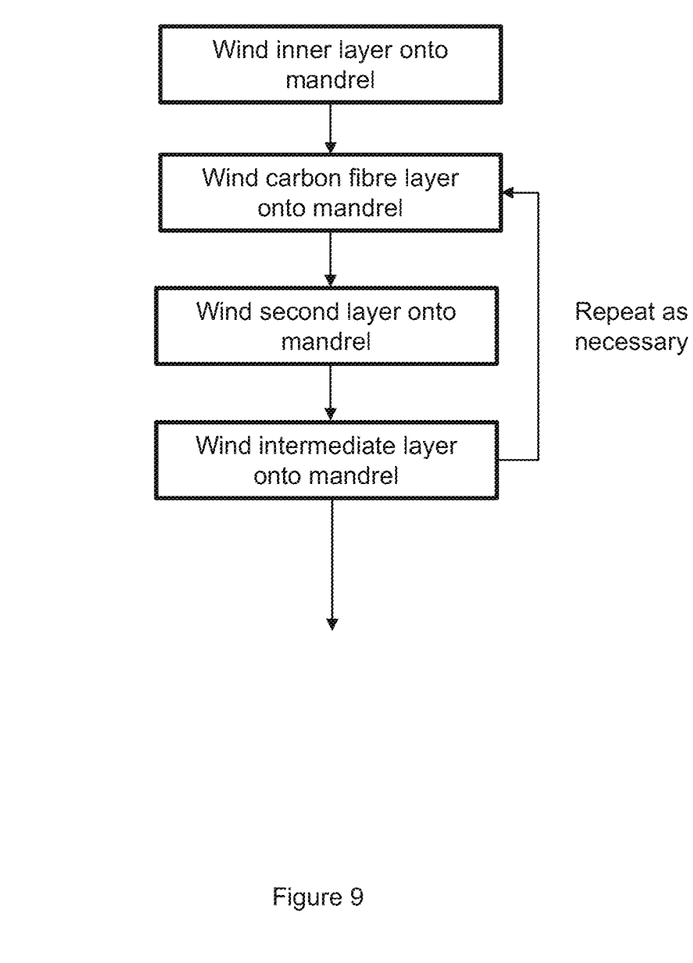
FIG. 9 is a flow diagram illustrating a method of manufacturing the sleeve of FIG. 4.

FIG. 9 illustrates a first phase of a method of manufacturing the sleeve 46. In a first step, the optional inner layer of glass fibres 52 are wound onto a mandrel until the desired radial thickness is achieved. The glass fibres can either be pre-impregnated with resin ("pre-preg"), or the resin can wetted with resin directly before being wound onto the mandrel. Optionally, this step can be omitted.

In a second step, a layer of carbon fibre is wound onto the mandrel in a generally circumferential direction. Again, the carbon fibres can be pre-preg or impregnated in a wet winding process.

In a third step, a layer of glass fibre is wound onto the mandrel. Typically, this is achieved by laying sheets or tape of glass fibre impregnated with resin onto the mandrel at the desired angle.

The intermediate layer is then laid onto the mandrel in a fourth step. Steps one to four are then repeated as many times as necessary until the required sleeve thickness is built up.

Figure 10A:
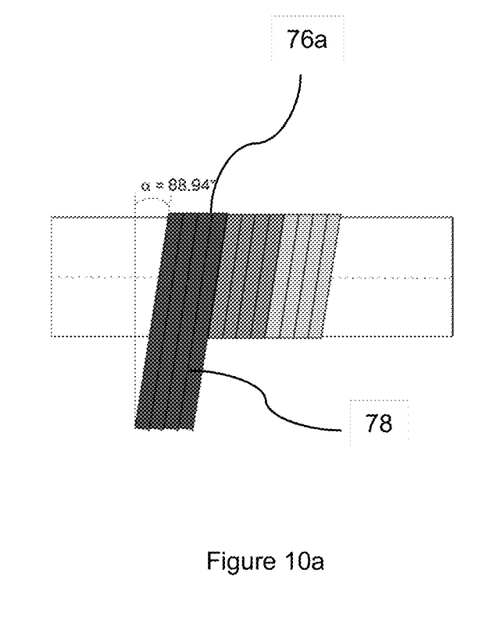
FIGS. 10a and 10b are diagrams illustrating a method of controlling fibre angle.
Figure 10B:
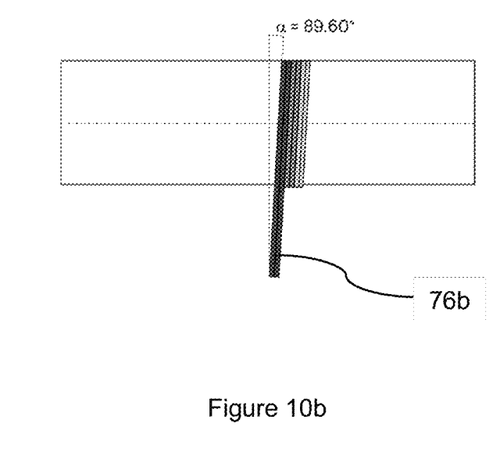

FIGS. 10a and 10b illustrate a method by which the angle of the carbon fibre filaments 68 can be varied. Carbon fibre rovings 76a, 76b are provided, having an axial width when wound around the sleeve. By varying the width of the carbon fibre tape, the angle is varied, with wider rovings resulting in angles closer to the axial direction for a given diameter sleeve. Commonly, rovings of fibre having a predetermined number of fibres in each roving are commercially available. In one example, a tape comprising four "24 k" rovings 78 (i.e. a roving comprising 24,000 fibres) is wound around a mandrel. This results in a fibre orientation of 88.94°, as shown in FIG. 10a.

FIG. 10b shows a second arrangement, in which a tape 76b comprising two 12 k rovings is used. This results in a sleeve having a fibre composite orientation angle of 89.6° from the axial direction. During testing, this sleeve was found to have a 30% improvement in tensile strength compared to the sleeve having an orientation of 88.94°. Consequently, a small difference in carbon fibre orientation can have a large impact on overall sleeve strength. During testing, it has been found that acceptable strength is provided when the fibre composite has an angle no less than 89.2°.

One option for installation of the sleeve onto the rotor, would be to wind the sleeve directly onto the rotor. However, a problem with this process is that the matrix material typically requires a high temperature to cure. On the other hand, using this method, the curing process must be undertaken at a temperature below the Curie temperature of the permanent magnets 44, otherwise magnetisation of the magnets will be lost. Consequently, the sleeve must be built up slowly and cured in multiple stages, resulting in a time consuming and slow process. This method also tends to lead to reduced pre-stress, since the pre-stress decreases during the curing step. The pre-stress using this installation method has been found to be limited to around 500-800 MPa in practice.

Figure 11:
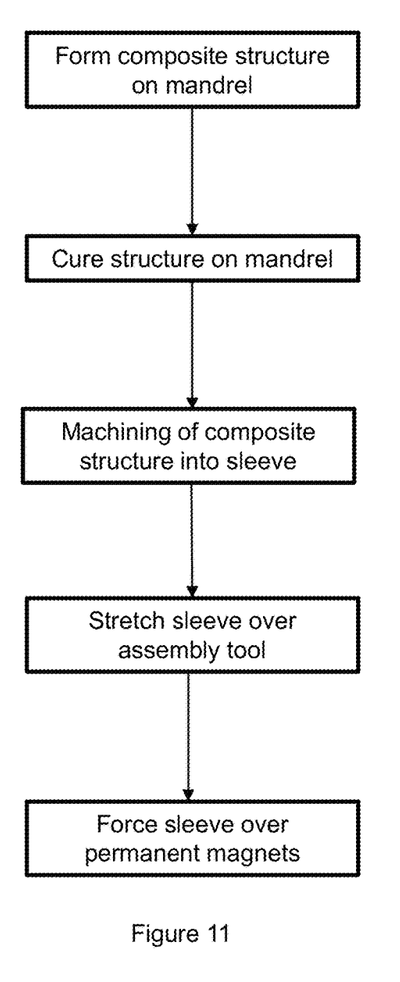
FIG. 11 is a flow diagram illustrating a method of installing the sleeve on a rotor of an electric machine.
Figure 12:
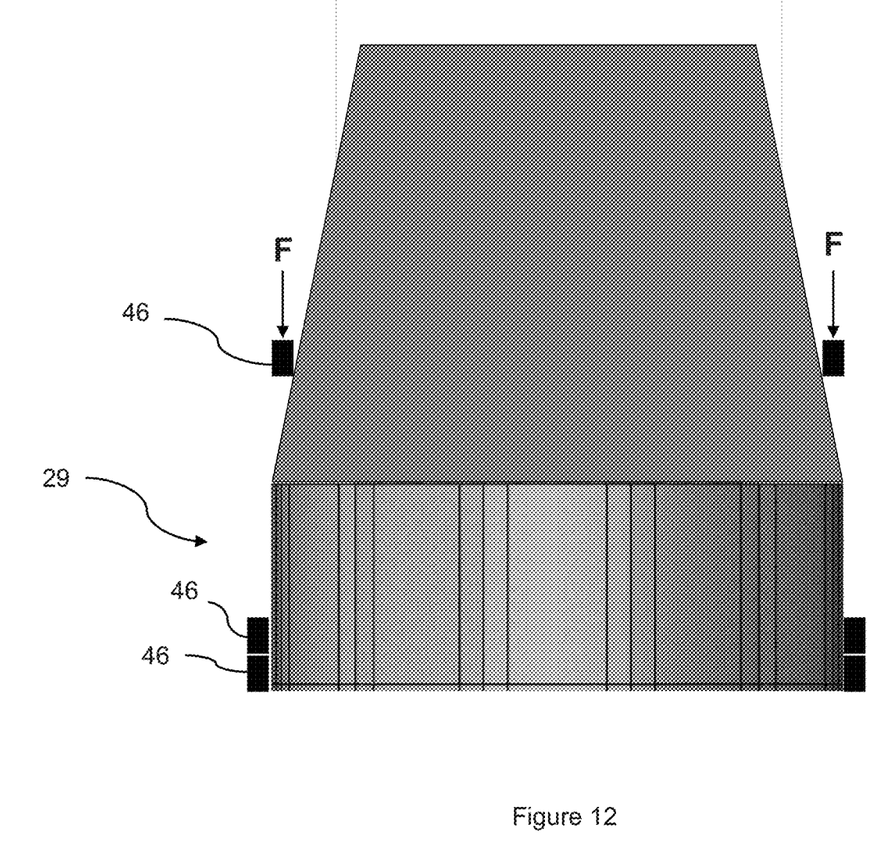
FIG. 12 is a cross-sectional side view of an assembly apparatus for carrying out the method of FIG. 11.

A second method is illustrating in FIG. 11, which utilises an apparatus shown in FIG. 12. The sleeve 46 is first produced by the process shown in FIG. 9 and described above. This may be conducted using pre-impregnated fibres that are directly placed on the mandrel or dry fibres that are drawn through a resin bath and then placed on a mandrel in what is known as a wet filament winding process.

In a second step, the structure is cured on the mandrel. Since the mandrel does not have to maintain magnetisation, the curing process can take place at a higher temperature.

In a third step, the sleeve is optionally cut into smaller rings, and forced over a conical assembly tool 64, shown in FIG. 12. The assembly tool 64 has an outside diameter which tapers outwardly from a smaller diameter to a larger diameter which matches or slightly exceeds the outer diameter of the permanent magnets 46 of the rotor 29. By forcing the sleeve 46 over the assembly tool 64, a pre-tension is applied, which increases the radially inward force applied by the sleeve 46 to the permanent magnets 44 when installed.

In a fourth step, the sleeve 46 is forced onto the permanent magnets 44, until the sleeve 46 is fully installed in the desired position. At this point, the sleeve 46 is fully installed on the rotor 29, with an interference fit.

This installation method with high level of pre-stress has previously been tried by the inventors with conventional composite sleeves, but has been unsuccessful. In those cases, the composite sleeve was damaged by the installation process, leading to breakage of the fibres. By providing an inner layer 52 having a lower modulus of elasticity, the high modulus fibres are protected from mechanical damage during the press-fitting process, and so the sleeve can be more readily stretched over the assembly tool, without damaging the fibres of the second layer 54.

The disclosed sleeve and assembly method have been found by the inventors to provide a rotor sleeve having increased strength and reduced thickness relative to prior arrangements, in view of the increased pre-tension that can be applied. In one example, the radial thickness of the sleeve was reduced from 10.2 mm to 8.4 mm. It will be appreciated that, as well as resulting in a direct reduction in weight, the reduced thickness also reduces the effective size of the airgap between the rotor 29 and stator 50. This in turn increases the transmission of torque between the rotor and stator, and so increases power density. In one electric machine to which the sleeve has been applied by the inventors, this has resulted in an overall weight reduction of 77 kg for a 2.5 megawatt (MW) electric machine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The electric machine may be used for other applications. For example, the electric machine may be utilised as a starter/generator for a gas turbine engine. Alternatively, the electric machine may be used as either a generator or a motor in any other suitable application, such as an electric airliner that does not include a gas turbine engine.

The invention claimed is:

1. A rotor sleeve for a rotor of an electric machine, the rotor sleeve defining a rotational axis and comprising:
a plurality of first layers of carbon fibre reinforced polymer, each first layer comprising fibres oriented between 89° and 90° to the rotational axis;
at least one second layer of fibres comprising one or more of glass fibre, aramid, ultra-high molecular weight polyethylene, nylon or poly(p-phenylene-2,6-benzobisoxaole) (PBO) within a matrix material, wherein:
the at least one second layer is provided between two layers of the plurality of first layers,
the fibres of the plurality of first fibers have a higher modulus of elasticity than the fibres of the at least one second layer, and
the fibres of the at least one second layer are oriented between 50° and 75° relative to the rotational axis.

2. The rotor sleeve according to claim 1, wherein the fibres of each first layer are oriented between 89.2° and 89.9° to the rotational axis.

3. The rotor sleeve according to claim 2, wherein the fibres of each first layer are oriented approximately 89.5° to the rotational axis.

4. The rotor sleeve according to claim 1, wherein each first layer defines a radial thickness of no more than 2 mm.

5. The rotor sleeve according to claim 1, wherein the sleeve comprises between 5 and 20% low modulus of elasticity fibre reinforced composite.

6. The rotor sleeve according to claim 1, wherein the fibres of the at least one second layer are oriented approximately 60° relative to the rotational axis.

7. The rotor sleeve according to claim 1, wherein the fibres of the at least one second layer comprise first fibres oriented 50° to 75° relative to the rotational axis in a clockwise direction interwoven with second fibres oriented 50° to 75° relative to the rotational axis in an anti-clockwise direction.

8. The rotor sleeve according to claim 1, wherein the fibers of the plurality of first layers and the at least one second layer are provided within a matrix material comprising one or more of epoxy, cyanate ester or phenolic resin.

9. A method of manufacturing a sleeved rotor of an electric machine, the method comprising:
providing a first layer of carbon fibre filaments aligned substantially 90° relative to a rotational axis;
providing a second layer of fibre filaments comprising one or more of glass fibre, aramid, ultra-high molecular weight polyethylene, nylon or poly(p-phenylene-2,6-benzobisoxaole) (PBO) within a matrix material, the fibers having a lower modulus of elasticity than the carbon fibre filaments wound around the first layer of carbon fibre filaments; and
providing a third layer of carbon fibre filaments around the second layer of fibre filaments aligned substantially 90° to the rotational axis; wherein
the fibres of the first layer and the third layer have a higher modulus of elasticity than the fibres of the second layer, and
the fibres of the second layer are oriented between 50° and 75° relative to the rotational axis.

10. The method according to claim 9, wherein the fibres of the second layer comprise first fibres oriented 50° to 75° relative to the rotational axis in a clockwise direction interwoven with second fibres oriented 50° to 75° relative to the rotational axis in an anti-clockwise direction.

11. The method according to claim 9, wherein the rotor comprises one or more permanent magnets, and the method comprises sliding the sleeve over the outer diameter over the one or more permanent magnets.

12. The method according to claim 9, wherein the method comprises, in a first step, winding the first, second and third layers of filaments around a mandrel, followed by curing of the filaments to form a composite ring.

13. The method according to claim 12, wherein the method comprises, in a second step subsequent to the first step, urging the ring over a conical stressing device to increase an inner diameter of the ring and produce a pre-stress on the ring, and sliding the sleeve over the outer diameter of the rotor.

14. An electric machine comprising a rotor fitted with the rotor sleeve according to claim 1.

15. The electric machine according to claim 14, wherein the electric machine is configured to operate as one or both of a generator and a motor.

16. The electric machine according to claim 14, wherein the electric machine comprises a permanent magnet electric machine comprising one or more surface permanent magnets provided at an outer diameter of the rotor.

* * * * *